United States Patent Office 3,317,013
Patented May 2, 1967

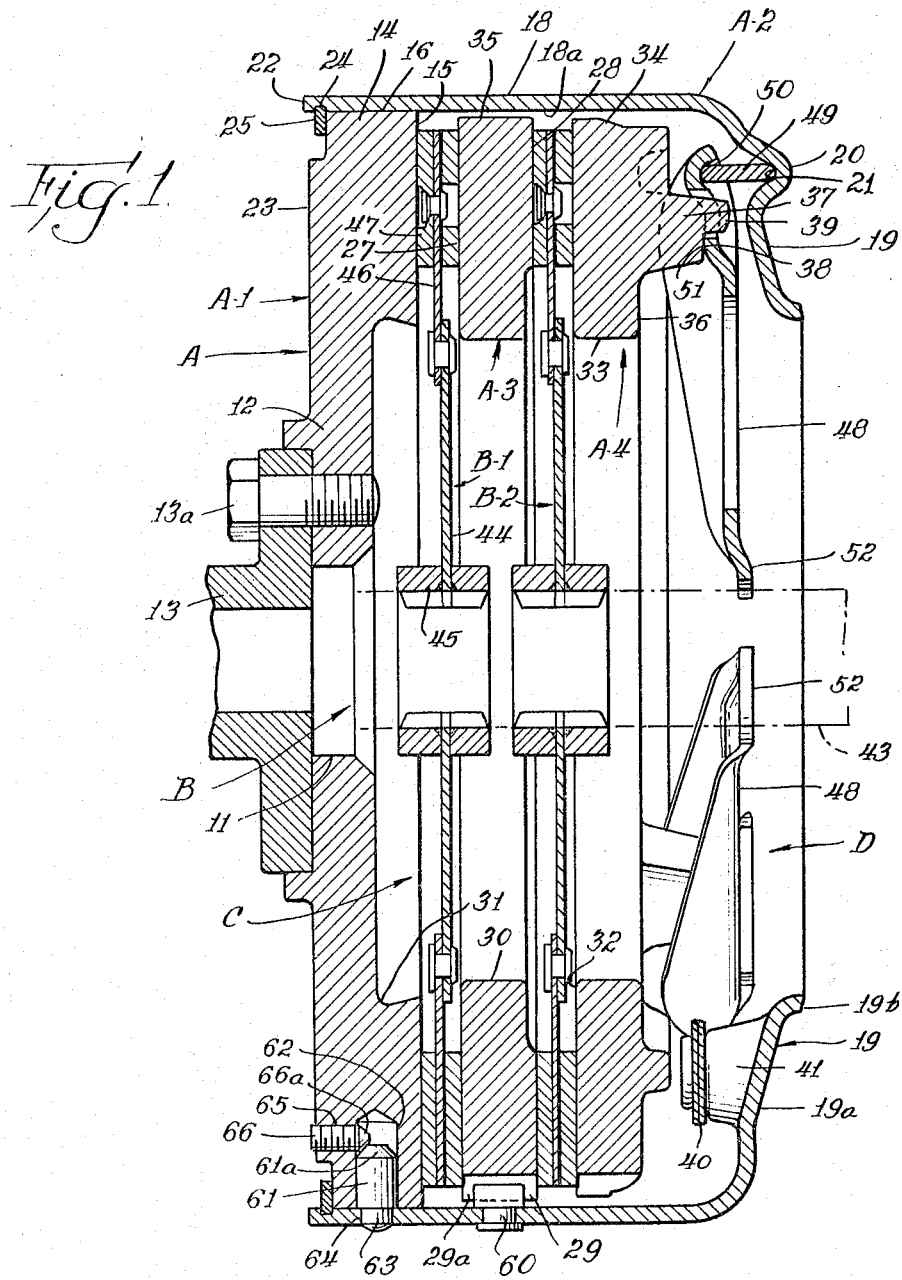

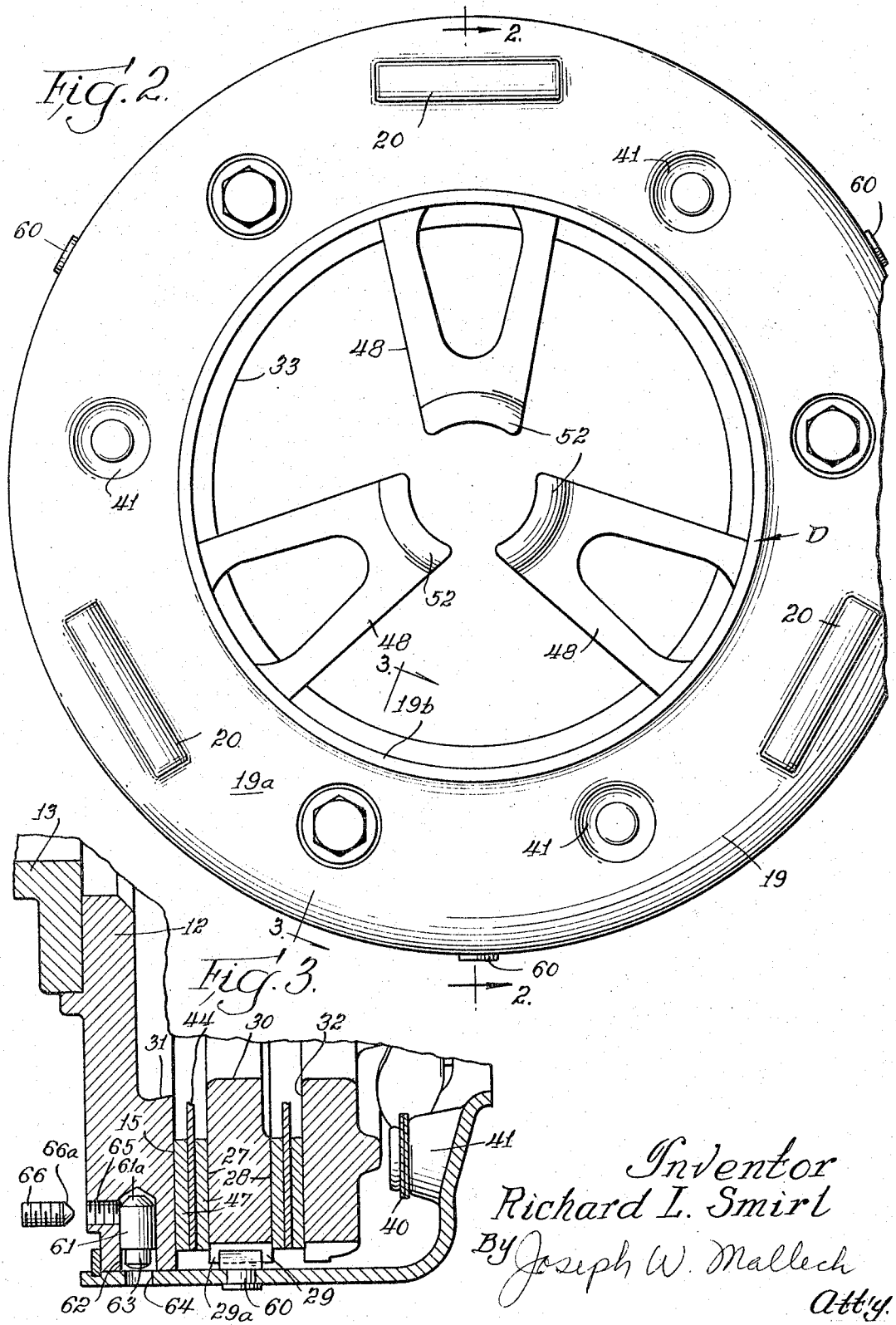

3,317,013
MULTIPLE PLATE CLUTCH CONSTRUCTIONS
Richard L. Smirl, La Grange Park, Ill., assignor to Borg-Warner Corporation, Chicago, Ill., a corporation of Illinois
Filed Dec. 30, 1964, Ser. No. 422,182
3 Claims. (Cl. 192—69)

This invention relates to multiple disc or pressure plate clutches and more particularly to a clutch of this type which may be used in a reduced size from comparable clutches while maintaining high energy absorption characteristics.

The primary object of this invention is to provide a multiple pressure plate clutch with greater space saving characteristics and which enable the clutch to be installed in more strict space requirements of modern vehicles.

Another object of this invention is to provide a multiple pressure plate friction clutch which employs unique structure enabling the assembly to be more easily put together as well as dissembled.

Another object of this invention is to provide a multiple pressure plate clutch having space saving qualities while employing a sheet metal cover effective to take the reaction loads from an actuating means, said cover plate being characterized by a back wall formed of conical sections providing greater resistance to deflection by the reaction load.

And yet another object of this invention is to provide a multiple pressure plate clutch comprised of a sheet metal cover plate and which employs a remote spring type actuating assembly having a plurality of radially arranged levers fulcrumed on the pressure plate by virtue of a plurality of struts, the struts and levers being maintained in operative relations by an offset strap construction drivingly associating one of the pressure plates with the cover plate.

Other objects and advantages of the invention will become apparent from the following detailed description taken in connection with the accompanying drawings in which:

FIGURE 1 is a central sectional elevation view of a clutch device embodying the principles of this invention, and taken substantially along line 2—2 of FIGURE 2;

FIGURE 2 is a plan view of the clutch device in FIGURE 1; and

FIGURE 3 is a fragmentary sectional view illustrating one stage of assembly of the clutch device.

Turning now to the drawings and more particularly to FIGURE 1, the multiple pressure plate clutch, designated 10 broadly comprises rotative input means A including a flywheel A–1 with a sheet metal cover plate A–2 uniquely associated therewith to define an interior clutch chamber C of substantial axial depth; at least two pressure plates A–3 and A–4 are disposed in said chamber C while rotatively driven by said cover plates A–2. A rotative output means B provided with a plurality of discs, comprising here B–1 and B–2, each drivingly splined to an output shaft 43. An actuating lever assembly D is employed to transmit force from a remote location, such as a remote spring, and effectively apply this force to the pressure plate for promoting clutch engagement.

In more particularity, the flywheel A–1 is of an annular configuration having a central opening 11, and a radially inner periphery 12 secured to the flange of an input shaft 13 by suitable fasteners 13a. The radially outer portion 14 of the flywheel presents an annular frictional surface 15 which extends entirely to the outer cylindrical wall 16 of the flywheel.

The sheet metal cover plate A–2 has a drum or cylindrical portion 18 provided with an interior surface 18a effective to snugly fit about the exterior periphery 16 or the flywheel; the portion 18 shown in cross section, in FIGURE 1, is straight and has an axial dimension generally commensurate with the radial dimension of the annular cover plate. The cover plate has a back wall 19 comprised of a conical section 19a which integrates into the cylindrical portion 18 by gradual curvature, the inner periphery of the conical section 19a having a rearwardly bent annular lip 19b. Circumferentially spaced indentations or folds 20 are stamped into the rear wall 19. The folds are generally elongated in configuration (see FIGURE 2) and have an inner concave surface 21. The annular disposition of the conical section 19a is generally axially aligned with the friction surface 15. The front edge 22 of the cover plate overlaps the front wall 23 of the pressure plate, the former containing an annular groove 24 effective to receive a snap ring 25 as will be described.

The annular pressure plate A–3 is disposed in the interior space defined by the cover plate and presents two oppositely facing frictional surfaces 27 and 28. The outer periphery of the pressure plate A–3 is provided with a plurality of axially extending splines 29 effective to intermesh with keys extending inwardly from the cover plate as will be described. The extremities of the splines 29a are very closely adjacent the interior wall 18a of the cover section 18, the space being sufficient to permit slight relative axial movement between the members. The inner periphery 30 of the plate A–3 is generally aligned with the interior periphery of the flywheel. Pressure plate A–4 is disposed adjacent the rear wall 19 of the cover plate and presents a single annular friction surface 32 facing the frictional surface 28 of pressure plate A–3. The inner and outer peripheries, 33 and 34, of pressure plate A–4 are aligned with the inner and outer peripheries, 30 and 35, of pressure plate A–3. The back wall 36 of pressure plate A–4 has a plurality of circumferentially spaced bosses 37 extending rearwardly therefrom (see FIGURE 1), each boss disposed intermediate the inner and outer periphery of the pressure plate and carrying a flat surface 38 lying in a plane parallel to the rotation of the clutch device. Each boss has a nose 39 extending rearwardly therefrom adjacent and radially outwardly of flat surface 38. Pressure plate A–4 is drivingly connected to the cover plate A–2 by chordally disposed straps 40, each strap having one end secured to an indented portion 41 of the cover plate, said portion 41 being circumferentially spaced about the rear wall 19 of the cover plate. The opposite end of each strap is secured to an intermediate portion of the pressure plate A–4, the straps having a pre-offset configuration prior to assembling the device whereby they normally urge the pressure plate A–4 toward disengagement; when full disengagement is achieved by the straps abutting a portion of the rear wall 19, the straps are still stressed by not having fully returned to their original offset condition so that they maintain a uniform retraction force continuously. A more detailed description of straps 41 may be had by reference to U.S. application Ser. No. 163,629 (U.S. Patent No. 3,167,163) which is incorporated herein by reference.

The output means comprises frictional discs B–1 and B–2 with each disc drivingly splined to an output shaft 43. Each of the frictional discs may be of conventional construction whereby an annular metallic plate 44 is secured to a hub 45 which in turn is splined to the output shaft 43, the annular plate 44 carrying a plurality of circumferentially arranged metallic cushions 46 which in turn mount rings of frictional material 47 on opposite sides thereof. The rings of frictional material being generally aligned with the frictional surfaces of said pressures plates and flywheel.

The actuating means D is of the remote spring type, wherein a plurality of radially disposed levers 48 are arranged to fulcrum upon the cover plate by virtue of a rockable strut 49 having parallel rounded edges, one edge being received by the concave surface 21 of the cover plate and an opposite rounded edge received by a concave surface 50 coined in the outer extremity of the lever 48. An intermediate portion of each lever is provided with a cylindrical surface 51, effective to roll upon the flat surface 38 of each pressure plate boss. The inner extremities 52 of the levers are adapted to receive a clutch engaging force, such as may be received from a remotely disposed spring and transmitted by a linkage system. Release of the engaging force permits the retraction drive straps 40 to effectively retract the outer pressure plate A–4 permitting the intermediate pressure plate A–3 to float freely with respect to an axial direction, thereby releasing the clamping grip upon the driven discs B–1 and B–2.

A particular characteristic of this invention is the ease with which the clutch device may be assembled or disassembled. In vehicle installations, where the fasteners 13a are accessible and may be fastened after the clutch device is fully assembled as a unit, the following assembly sequence may be utilized.

(1) First, the cover A, the levers 48, the strut 49 and pressure plate A–4 are assembled with the cover plate having its axis generally vertical. To do this, the cover plate may be placed with its rear wall 19 on a bench surface with the opened portion facing upwardly. The assembly of the above parts may be accomplished by hand and installed in the position generally indicated in FIGURE 1. (2) The rear friction disc B–2 may then be tilted into place on top of the frictional surface 32 of pressure plate A–4 by merely dropping it into place accompanied by the tilting action. The tilting action is necessary so that disc may pass the square drive pins 60 which extend through the section 18 of the cover plate and which serve as a splined driving connection to the pressure plate A–3. The intermediate pressure plate and front frictional disc B–1 may then be simply dropped into place in proper order as the disc B–2; these components may be inserted without any tilting action provided pressure plate A–3 has peripheral teeth thereon aligned with the square drive pin 60. (3) The flywheel A–1 is then placed on top of the disc B–1 with the cylindrical pins 61 pushed inwardly within the circumferentially spaced cylindrical openings 62 provided in the outer periphery of the pressure plate (as shown in FIGURE 3). The reduced outer extremity 63 of the pins are maintained flush with the outer periphery 16 of the flywheel. The flywheel is adjusted so that the pins and openings 62 are generally aligned with the smaller openings 64 provided in the cover plate. (4) Manual pressure is then applied to the flywheel A–1 depressing the stack of pressure plates and discs downwardly and thereby depressing the inner end 52 of the levers. The snap ring 25 is then seated within the groove 24 of the cover plate; before manual pressure is released, pins 61 are pushed upwardly so that the extremities 63 may be received by the reduced openings 64 in the cover plate. This may be accomplished by using a blunt pick or awl inserted into the lock screw threaded openings 65 which provide access to the bottom of the cylindrical openings 62. (5) The self locking set screws 66 are then installed and threadably advanced to force the pins 61 radially outwardly and lock the pins 61 in the engaged position with the cover plate. The self locking set screws 66 are capable of doing this by the provision of a conical surface 66a on the set screws and a mating conical surface 71a at the bottom of the pin 61, the conical surfaces being generally at 45 degrees to the axis of the screw or pin.

For conventional installations where the fasteners 13a of the input shaft are not accessible but a peripheral portion of the flywheel is accessible, the following method of installation may be utilized. Steps (1) and (2) of the previous assembly method is utilized, except that the axis of the cover plate is maintained horizontal rather than vertical. Step (3), the flywheel being mounted upon the drive shaft previously, is rotated to position one of the pins 61 near bottom center. This pin would normally drop out of the cylindrical opening 60 by virtue of gravity but must be held in place while the cover plate is slipped over the flywheel and the snap ring 25 installed, the cover containing the stack up of discs B–1, B–2 and pressure plates A–3 and A–4. The upper pins, since there are generally three circumferentially spaced, will remain in place during this step since gravity will pull them into the cylindrical openings 62. Then the previous steps (4) and (5) should be followed as in the previous assembly method.

The particular structure of this clutch device permits extreme compactness, there being no usual coiled springs or engaging means in the cover plate, the necessary coupling between the cover plate and flywheel being accomplished without the necessity of increasing the diameter of the clutch beyond that required for the pressure plate and frictional surfaces. Thus, the entire face or frictional surface 15 of the flywheel may be utilized as an effective frictional face, whereas in previous constructions, the face extended into an area for accommodating as an exterior fastening means.

While I have described my invention in connection with one specific embodiment and other alternative suggestions thereof, it is understood that these are by way of illustration and not by way of limitation and the scope of my invention is defined solely by the appended claims which should be construed as broadly as the prior art will permit.

I claim:

1. A friction device, comprising: a rotative driving assembly having a flywheel with a front face and an annular cylindrical outer surface concentric with the axis of rotation of said flywheel, said flywheel presenting a first frictional surface with an outer periphery defined by said outer surface, and a sheet metal cover plate having a circular cylindrical portion provided with outer and inner surfaces, the cover plates inner surface being substantially equal in diameter to the outer surface of said flywheel, said cover plate having a conically shaped rear wall depending radially inwardly and defining in cooperation with said flywheel an annular chamber with an axial depth generally more than 75 percent the diameter of said flywheel, said rear wall having a plurality of elongated semi-cylindrical surfaces defined in the inner side thereof and disposed adjacent but radially inwardly of the cylindrical portion of said cover plate, a driven assembly comprising a rotative output shaft concentrically disposed with respect to said flywheel and drivingly carrying a plurality of frictional discs, each disc presenting oppositely facing frictional surfaces each having an outer periphery less in diameter than the diameter of said flywheel, an actuating assembly comprising an intermediate pressure plate disposed between said frictional discs and presenting oppositely facing frictional surfaces each defined by the outer periphery of said intermediate plate which is slightly less than the diameter of said flywheel, and an outwardly disposed pressure plate presenting a frictional surface facing said flywheel frictional surface and defined by the outer periphery of the outward pressure plate, spaced flat surfaces provided on said outward pressure plate parallel to the plane of rotation of said device, and a plurality of radially disposed and circumferentially spaced levers, each lever having one end effective to fulcrum upon said cover plate, an intermediate portion carrying a semi-cylindrical surface effective to roll upon a flat surface of said outward pressure plate, and an inner portion effective to receive a clutch engaging force for urging said pressure plates toward said flywheel to promote interengagement of said frictional surfaces, a plurality of struts each having opposite edges with one edge rockably received by said semi-cylindrical surface of a lever, and means interconnecting the cover plate with both said flywheel and with said pressure plates, said means comprising a plurality of pre-stressed chordally disposed straps interconnecting one portion of said rear wall with another portion of said outward pressure plate effective to transmit rotative drive therebetween as well as maintain a constant retraction force upon said outermost pressure plate during all conditions of the clutch, said intermediate pressure plate having axially extending slots provided in the outer periphery thereof and said cover plate having a plurality of pins extending inwardly from the inner surface thereof effective to engage within one of said slots on said intermediate pressure plate for transmitting rotative drive therebetween while permitting relative axial adjustment, and means drivingly connecting said flywheel with said cover plate comprising pins extending radially therebetween and disposed radially inwardly of the outer surface of said cover plate, said latter means having a stop limiting the radial outward movement of said pins, and retractable threaded screws effective to maintain said pins engaged with said stop.

2. A clutch device comprising: a rotating driving member having an axis of rotation, a plurality of interleaved driven elements and pressure elements interconnected with said driving member, said elements being stacked in alignment with said driving member, a cover member having a first wall extending along and adjacent to the end of said stacked elements opposite from said driving member; said cover member also having a second wall extending along said axis and about the peripheries of said stacked elements, actuating means operating between said cover member first wall and said stacked elements effective to promote selective conjoint rotation, and means for securing a terminal edge of said cover member to said driving member, said securing means comprising at least one pin slidably carried by said driving member inaccessible through the front face of said driving member, said securing means also having a second member threadably adjustable through the front face of said driving member and in a direction parallel to the axis of rotation and effective to urge said pin radially outwardly to engage said cover member.

3. A frictional device, comprising: a rotative driving assembly comprising an annular flywheel having a front face and a radially outer periphery defined by a circular cylindrical surface, said flywheel presenting a first frictional flat surface parallel to the plane of rotation of said flywheel and having an outer periphery defined by the cylindrical surface of said flywheel, and a sheet metal cover plate having a generally radially directed wall and a cylindrical portion fitting snugly and concentrically about the cylindrical surface of said flywheel, the inner periphery of said cover plate cylindrical portion being substantially equal in diameter to the cylindrical surface of said flywheel, a rotative driven assembly having a plurality of discs arranged for limited axial movement, each disc presenting annular frictional surfaces having outer peripheries slightly less in diameter than the diameter of said flywheel cylindrical surface, and an actuating assembly having means drivingly associating said actuating assembly with said cover plate, said actuating assembly comprising annular pressure plates carrying frictional surfaces each having an outer periphery defined by the radially outer portion of each of said plates which is slightly less than the diameter of said flywheel cylindrical surface, means reacting between said radially directed wall of said cover plate and at least one of said pressure plates to apply a clutch engaging force effective to bring several frictional surfaces of said flywheel, discs and pressure plates together to promote conjoint rotation, and means drivingly associating said cover plate and flywheel and being disposed substantially at or radially inwardly of the outer surface of said cover plate cylindrical portion, said means drivingly associating said flywheel with said cover plate comprises a plurality of radially directed and circumferentially spaced cylindrical openings in the outer surface of the flywheel, a plurality of aligned openings in said cover plate smaller in diameter than the openings in said flywheel, and a plurality of pins with one pin received in each of said openings, said pins having a stepped configuration with one portion effective to fit snugly within the openings in said flywheel and another portion effective to fit snugly within the openings in said cover plate, and retractable means accessible through the front face of said flywheel effective to urge said pins into a position having said portions disposed in both said cover plate and flywheel.

References Cited by the Examiner
UNITED STATES PATENTS

| | | | |
|---|---|---|---|
| 2,296,538 | 9/1942 | Reed | 192—68 |
| 2,354,829 | 8/1944 | Reed | 192—69 |
| 2,880,835 | 4/1959 | Haas | 192—69 X |
| 3,061,062 | 10/1962 | Smirl | 192—69 |
| 3,167,163 | 1/1965 | Cook et al. | 192—99 X |

References Cited by the Applicant
UNITED STATES PATENTS

| | | |
|---|---|---|
| 891,475 | 6/1908 | Heaslet. |
| 1,461,343 | 7/1923 | Barbarou. |
| 1,700,244 | 1/1929 | Wemp. |
| 1,717,355 | 6/1929 | Carhart. |
| 1,750,828 | 3/1930 | Wemp. |
| 1,756,428 | 4/1930 | Jones. |
| 2,001,395 | 5/1935 | Pearmain. |
| 2,385,517 | 9/1945 | Hunt. |
| 2,879,872 | 3/1959 | Van Ranst. |

BENJAMIN W. WYCHE, III, *Primary Examiner.*

DAVID J. WILLIAMOWSKY, *Examiner.*